(12) United States Patent
Liu et al.

(10) Patent No.: US 7,307,517 B2
(45) Date of Patent: Dec. 11, 2007

(54) WIRELESS TORQUE SENSOR

(75) Inventors: James Z T Liu, Belvidere, IL (US);
James D. Cook, Freeport, IL (US);
Fred W. Hintz, Freeport, IL (US);
Steven J. Magee, Lena, IL (US);
Richard M. Andrews, Freeport, IL (US); Randy J. Hasken, Lanark, IL (US); Stephen R. Shiffer, Xenia, OH (US)

(73) Assignee: Honeywell International Inc., Morristown, NJ (US)

( * ) Notice: Subject to any disclaimer, the term of this patent is extended or adjusted under 35 U.S.C. 154(b) by 211 days.

(21) Appl. No.: 11/199,435

(22) Filed: Aug. 5, 2005

(65) Prior Publication Data

US 2007/0030134 A1 Feb. 8, 2007

(51) Int. Cl.
*B60Q 1/00* (2006.01)

(52) U.S. Cl. ............... 340/441; 340/572.7; 340/686.3

(58) Field of Classification Search ............ 340/572.1, 340/572.4, 572.7, 572.8, 426.24, 426.25, 340/438, 439, 441, 444, 505, 686.2, 686.3, 340/10.1, 870.28, 10.41; 73/117.2, 117.3, 73/779, 862.045; 81/467, 479
See application file for complete search history.

(56) References Cited

U.S. PATENT DOCUMENTS

| | | | |
|---|---|---|---|
| 5,297,439 A * | 3/1994 | Tyren et al. ............... 73/779 |
| 6,234,051 B1 * | 5/2001 | Bareggi ...................... 81/479 |
| 6,269,702 B1 * | 8/2001 | Lambson ............... 73/862.045 |
| 6,297,747 B1 * | 10/2001 | Magori et al. ......... 340/870.28 |
| 6,419,609 B1 | 7/2002 | Lechner |
| 6,857,500 B2 | 2/2005 | Halstead et al. ............ 180/446 |
| 6,865,959 B2 | 3/2005 | Kilmartin et al. ............. 73/862 |
| 6,868,743 B2 | 3/2005 | Nakane et al. ......... 73/862.331 |
| 6,868,744 B2 | 3/2005 | Sugimura et al. ...... 73/862.333 |
| 6,892,588 B2 | 5/2005 | Nagase et al. ......... 73/862.326 |

(Continued)

FOREIGN PATENT DOCUMENTS

GB 2397379 A 7/2004

(Continued)

OTHER PUBLICATIONS

Kalinin V et al., Pulsed Interrogation of the SAW Torque Sensor for Electrical Power Assisted Steering, 2004 IEEE Int'l Conf., Aug. 2004, USA, p. 1577-1580.

(Continued)

*Primary Examiner*—Van T. Trieu
(74) *Attorney, Agent, or Firm*—Kermit D. Lopez; Luis M. Ortiz

(57) ABSTRACT

A torque sensing system generally includes a torque sensor comprising a torque sensing element configured upon a substrate in association with an antenna for sending and receiving wireless signals. A plurality of electronic controlling components for controlling the torque sensor, wherein the electronic controlling components are configured upon another substrate in association with an antenna for sending and receiving the wireless signals to and from the torque sensor, such that the torque sensor is located on a rotating member in order to generate signals indicative of a torque associated with the rotating member, and wherein the signals are wirelessly transmittable from the torque the via the antenna configured upon the substrate in association with the torque sensor.

20 Claims, 2 Drawing Sheets

U.S. PATENT DOCUMENTS

| | | | |
|---|---|---|---|
| 6,895,828 B2 | 5/2005 | Nakatani et al. | 73/862.331 |
| 7,021,180 B2 * | 4/2006 | Crane | 81/467 |
| 7,034,660 B2 * | 4/2006 | Watters et al. | 340/10.41 |
| 2003/0131670 A1 | 7/2003 | Lee | |
| 2005/0103126 A1 | 5/2005 | Naidu et al. | 73/862.331 |
| 2005/0103127 A1 | 5/2005 | Yang | 73/862.334 |

FOREIGN PATENT DOCUMENTS

| | | |
|---|---|---|
| WO | WO 91/13832 | 9/1991 |
| WO | WO 2006/035284 A1 | 4/2006 |
| WO | WO 2006/083469 A1 | 8/2006 |

OTHER PUBLICATIONS

Bill Drafts, Acoustic Wave Technology Sensors, IEEE Transactions on Microwave Theory, USA, vol. 49, No. 4, Apr. 2001, p. 795-802.

Lonsdale A et al., An Integrated Low Cost Sensor for the Direct Torque Control of Brushless DC Motors, Conference Proceedings Article, Nov. 1996, p. 6-1.

* cited by examiner

WIRELESS TORQUE SENSOR

TECHNICAL FIELD

Embodiments are generally related to sensing devices and components thereof. Embodiments also related to torque sensors. Embodiments additionally related to packaging configurations for torque sensors.

BACKGROUND OF THE INVENTION

In systems incorporating rotating drive shafts, it is often necessary to know the torque and speed of such shafts in order to control the same or other devices associated with the rotatable shafts. Accordingly, it is desirable to sense and measure the torque in an accurate, reliable, and inexpensive manner.

Sensors to measure the torque imposed on rotating shafts, such as but not limited to shafts in automotive vehicles, are utilized in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Prior methods for obtaining torque measurement in such systems have been accomplished through the use of contact-type sensors directly attached to the shaft being rotated. For example, one such type of sensor is a "strain gauge" type torque detection apparatus, in which one or more strain gauges are directly attached to the outer peripheral surface of the shaft and the applied torque is measured by detecting a change in resistance, which is caused by applied strain and is measured by a bridge circuit or other well-known means.

Another type of sensor used is a non-contact torque sensor wherein magnetostrictive materials are disposed on rotating shafts and sensors are positioned to detect the presence of an external flux which is the result of a torque being applied to the magnetostrictive material.

Such magnetostrictive materials require an internal magnetic field which is typically produced or provided by either pre-stressing the magnetostrictive material by using applied forces (e.g., compressive or tensile) in either a clockwise or counter clockwise to pre-stress the coating prior to magnetization of the pre-stressed coating in order to provide the desired magnetic field. Alternatively, an external magnet or magnets can be provided to produce the same or a similar result to the magnetostrictive material. In a further alternative, torque may be measured utilizing what is known as the magneto-elastic phenomenon; that is, to take advantage of this phenomenon in the context of a resonate sensor. In such a situation, the resonator frequency of a free-standing magneto-elastic sensor changes with strain.

To this end, magnetostrictive torque sensors have been provided wherein a sensor is positioned in a surrounding relationship with a rotating shaft, with an air gap being established between the sensor and shaft to allow the shaft to rotate without rubbing against the sensor. A magnetic field is generated in the sensor by passing electric current through an excitation coil of the sensor. This magnetic field permeates the shaft and returns back to a pick-up coil of the sensor.

The output of the pick-up coil is an electrical signal that depends on the total magnetic reluctance in the above-described loop. Part of the total magnetic reluctance is established by the air gap, and part is established by the shaft itself, with the magnetic reluctance of the shaft changing as a function of torque on the shaft. Thus, changes in the output of the pick-up coil can be correlated to the torque experienced by the shaft.

Regardless of the specific type of torque sensor utilized, torque sensing is required in automotive applications to provide direct torque measurements to engine or transmission control units. One of the problems with prior art torque sensors is that such devices must be mounted on a rotating shaft or in association with a rotating target and require complicated wired electrical connections to various external control units. The use of wired connections can result in additional costs during the manufacturing of the vehicle and are ultimately passed on to the consumer. It is believed that a solution to such problems involves the implementation of wireless configurations, which are disclosed in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for a wireless torque sensor.

It is yet another aspect of the present invention to provide for a wireless torque sensor in which one or more torque sensing elements are configured upon a substrate in association with an antenna for wireless transmission of torque sensing data.

It is a further aspect of the present invention to provide for a wireless torque sensing system in which controlling electronics for controlling a wireless torque sensor are configured upon the same substrate for wireless transmission of controlling signals to the torque sensor.

The aforementioned aspects and other objectives and advantages can now be achieved as described herein. A torque sensing system generally includes a torque sensor comprising a torque sensing element configured upon a substrate in association with an antenna for sending and receiving wireless signals. A plurality of electronic controlling components for controlling the torque sensor, wherein the electronic controlling components are configured upon another substrate in association with an antenna for sending and receiving the wireless signals to and from the torque sensor, such that the torque sensor is located on a rotating member in order to generate signals indicative of a torque associated with the rotating member, and wherein the signals are wirelessly transmittable from the torque the via the antenna configured upon the substrate in association with the torque sensor.

The rotating member typically comprises a shaft connected to, for example, an automotive engine or a transmission system. An engine control unit can be provided for controlling an automotive engine, wherein the engine control unit is connected to an antenna that receives a signal transmitted wirelessly from the torque sensor. Additionally or alternatively, a transmission control unit for controlling an automotive transmission can be implemented, wherein the transmission control unit is connected to an antenna that receives a signal transmitted wirelessly from the torque sensor.

In general, acoustic wave devices, such as an surface acoustic wave resonator (SAW-R), a surface acoustic wave delay line (SAW-DL), a surface acoustic wave filter (SAW-F) and/or a bulk acoustic wave resonator (BAW), can be utilized in the context of a wireless and passive strain measurement system as described herein. The measurement principle is the same for all such component. A transceiver sends RF pulses over an antenna in order to stimulate the sensor that produces a pulse response. Enough energy is typically available to re-transmit this signal for some time in the acoustic wave devices. In SAW-R, SAW-F and BAW devices, the signal is generally composed of a damped harmonic oscillation with the sensor's resonant frequency, whereas the SAW-DL produces several echo pulse after defined transit intervals. Strain data can be contained in the signal, which can be transferred through the use of antennas. The passive sensor and the interrogation side (reader) are generally linked through capacitive or inductive coupling.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
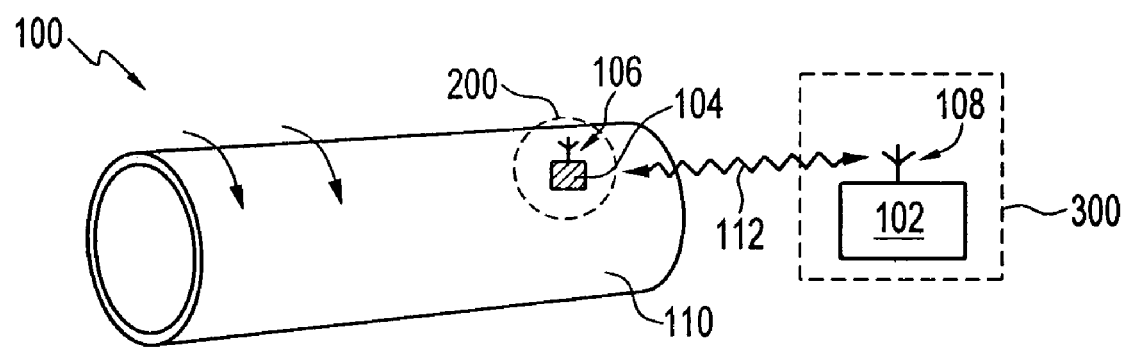
FIG. 1 illustrates a high-level diagram of a torque sensor system, which can be implemented in accordance with a preferred embodiment.

FIG. 1 illustrates a high-level diagram of a torque sensor system 100, which can be implemented in accordance with a preferred embodiment. Note that in FIGS. 1-6 herein, like or identical parts or elements are generally indicated by identical reference numerals. System 100 generally includes a rotating member 110 such as a shaft upon which a torque sensing element or sensor 104 can be located for detecting torque associated with rotating member 110. Torque sensor 104 incorporates an antenna 106, which can transmit and receive data to and from an electronics control unit 102 that incorporates an antenna 108. Note that the torque sensor 104 and its associated antenna 106 together can form a wireless torque sensor 200. The antenna 108 can be provided as, for example, a coupler or a capacitive coupling antenna component. The antenna may also be configured as, for example, an inductive coupling or simply a linear antenna.

Figure 2:
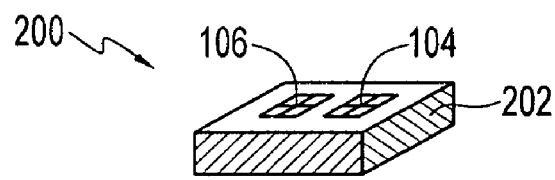
FIG. 2 illustrates a perspective view of a wireless torque sensor, which can be implemented in accordance with a preferred embodiment.

FIG. 2 illustrates a perspective view of a wireless torque sensor 200, which can be implemented in accordance with a preferred embodiment. As indicated in FIG. 2, the wireless torque sensor is generally composed of a torque sensor or sensing element 104 and antenna 106, which are both configured upon the same substrate 202. Note that the substrate 202 can be configure as, for example, a PC board or a metal impregnated plastic design.

Figure 3:
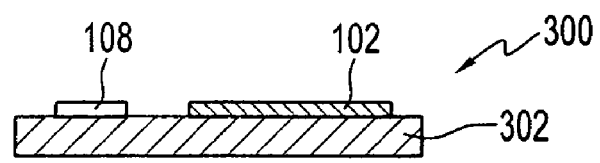
FIG. 3 illustrates a side view of an electronic control unit, which can be implemented in accordance with a preferred embodiment.

FIG. 3 illustrates a side view of an electronic control unit 300, which can be implemented in accordance with a preferred embodiment. Note that the electronic control unit 300 generally includes a single substrate 302 upon which both the controlling electronics 102 and the antenna 108 are configured. The torque sensing element 104 can be, for example, a magnetoresistive sensing element. Alternatively, torque sensing element 104 may be configured as an acoustic wave sensing element, such as form example, a surface acoustic wave (SAW) or bulk acoustic wave (BAW) sensing component. If torque sensing element 104 comprises an acoustic wave sensing element, then substrate 202 may be configured as a piezoelectric substrate.

Note that torque sensing element 104 can be provided in the context of an acoustic wave torque sensor. That is, sensing element 104 can be configured as acoustic wave sensing element utilized for the torque sensing operations described herein. Sensing element 104 can therefore be provided as, for example, one or more of the following components: a surface acoustic wave filter, a surface acoustic wave resonator, a surface acoustic wave delay line, a bulk acoustic wave resonator or a combination thereof, depending upon design considerations. Alternatively or in combination with such components, the torque sensing element 104 can be configured as a magneto-elastic toque sensor that measures a magnetic flux. Such a magneto-elastic toque sensor can also be utilized to measure a resonance frequency thereof.

Thus, the torque sensing element 104 is generally attached to the rotating member 110, but the controlling electronics 102 are essentially stationary and located external to the shaft 110 and the wireless torque sensor 200. Signals are therefore transferred between wireless torque sensor 200 and the electronics control unit 300. Note that substrate 302 can be provided, for example, as a printed circuit board (PCB) or a metal layer impregnated with plastic depending upon design considerations.

Figure 4:
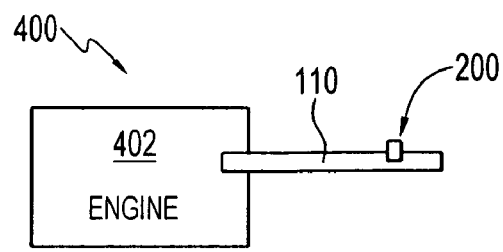
FIG. 4 illustrates a high-level diagram of a system for controlling an automotive engine, which can be implemented in accordance with one embodiment.

FIG. 4 illustrates a high-level diagram of a system 400 for controlling an automotive engine 402, which can be implemented in accordance with one embodiment. Note that system 400 can be implemented in accordance with the configurations depicted in FIGS. 1-3 herein. In system 400, the rotating member of shaft 110 can be connected to or utilized in association with engine 402. The wireless torque sensor 200 is mounted to the shaft 110 for detecting torque associated with shaft 110.

Figure 5:
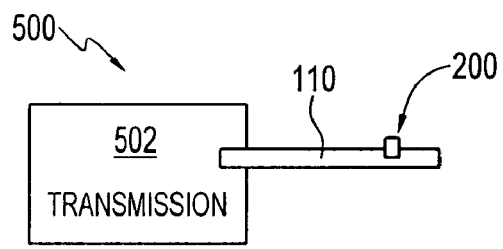
FIG. 5 illustrates a high-level diagram of a system for controlling an automotive transmission, which can be implemented in accordance with another embodiment.

FIG. 5 illustrates a high-level diagram of a system 500 for controlling an automotive transmission, which can be implemented in accordance with another embodiment. System 500 can also be implemented in accordance with the configurations depicted in FIGS. 1-3. In system 500, an automotive transmission 502 is connected to rotating member or shaft 110. Torque sensor 200 is again mounted to shaft 110 and transmits torque sensing data wireless to, for example, the electronics control unit 300 described earlier.

Figure 6:
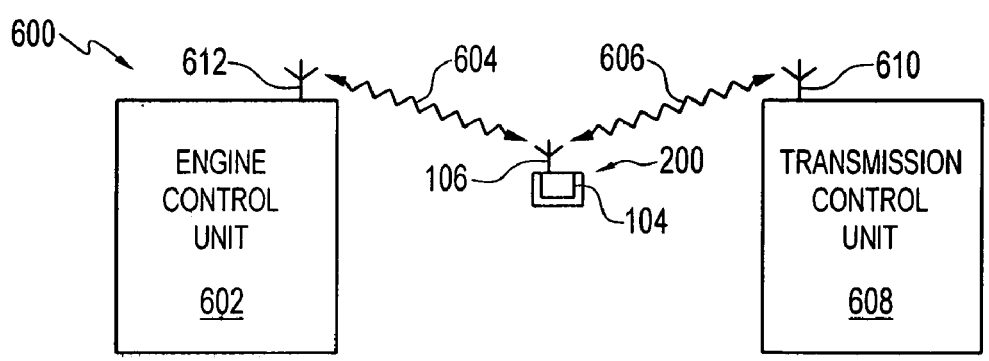
FIG. 6 illustrates a block diagram of a system for wireless transmitting torque detection data to an engine control unit and/or a transmission control unit, in accordance with a preferred embodiment.

FIG. 6 illustrates a block diagram of a system 600 for wirelessly transmitting torque detection data to an engine control unit 602 and/or a transmission control unit 608, in accordance with a preferred embodiment. Again, it is important to note in FIGS. 1-6, identical or similar parts or elements are generally indicated by identical reference numerals. Engine control unit 602 can be utilized to control operations associated with engine 402 depicted in FIG. 4. Engine control unit 602 incorporates an antenna 612, which transmits data wirelessly to and from wireless torque sensor 200, which can be located on shaft 110, as indicated earlier. Similarly, transmission control unit 608 incorporates the use of an antenna 610. Transmission control unit 608 generally controls operations associated with transmission 502 depicted in FIG. 5. Torque detection data can be transmitted wirelessly from the wireless torque sensor 200 to antenna 610 as indicated by arrow 610. The wireless transmission of data to torque sensor 200 and from engine control unit 602 is indicated in FIG. 6 by arrow 604.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque sensing system, comprising:
   a torque sensor comprising a torque sensing element configured upon a substrate in association with an antenna for sending and receiving wireless signals; and
   a plurality of electronic controlling components for controlling said torque sensor, wherein said plurality of electronic controlling components and an antenna are configured upon a single separate substrate for sending and receiving said wireless signals to and from said torque sensor, such that said torque sensor is located on a rotating member in order to generate signals indicative of a torque associated with said rotating member, wherein said signals are wirelessly transmittable from said torque sensor via said antenna configured upon said substrate in association with said torque sensor.

2. The system of claim 1 wherein said rotating member comprises a shaft.

3. The system of claim 1 further comprising an engine control unit for controlling an automotive engine, wherein said engine control unit is connected to an antenna that receives a signal transmitted wirelessly from said torque sensor.

4. The system of claim 1 further comprising a transmission control unit for controlling an automotive transmission, wherein said transmission control unit is connected to an antenna that receives a signal transmitted wirelessly from said torque sensor.

5. The system of claim 1 wherein said torque sensor comprises an acoustic wave torque sensor.

6. The system of claim 5 wherein said acoustic wave sensor comprises at least one of the following types of components;
   a surface acoustic wave filter;
   a surface acoustic wave resonator;
   a surface acoustic wave delay line; or
   a bulk acoustic wave resonator.

7. The system of claim 1 wherein said torque sensor comprises a magneto-elastic torque sensor.

8. The system of claim 7 wherein said magneto-elastic torque sensor measures a magnetic flux.

9. The system of claim 8 wherein said magneto-elastic torque sensor measures a resonance frequency of said magneto-elastic torque sensor.

10. The system of claim 1 wherein said antenna comprises a coupler or a capacitive coupling component.

11. The system of claim 1 wherein said antenna comprises an inductive coupling.

12. The system of claim 1 wherein said antenna comprises a linear antenna.

13. A torque sensing system, comprising:
    a shaft associated with an automobile engine;
    a torque sensor comprising a torque sensing element configured upon a substrate in association with an antenna for sending and receiving wireless signals;
    a plurality of electronic controlling components for controlling said torque sensor, wherein said plurality of electronic controlling components and an antenna are configured upon another single separate substrate for sending and receiving said wireless signals to and from said torque sensor, such that said torque sensor is located on said shaft in order to generate signals indicative of a torque associated with said shaft, wherein said signals are wirelessly transmittable from said torque sensor via said antenna configured upon said substrate in association with said torque sensor;
    an engine control unit for controlling said automotive engine, wherein said engine control unit is connected to an antenna that receives a signal transmitted wirelessly from said torque sensor; and
    a transmission control unit for controlling an automotive transmission associated with said automobile engine, wherein said transmission control unit is connected to an antenna that receives a signal transmitted wirelessly from said torque sensor.

14. A torque sensing method, comprising:
    providing a torque sensor comprising a torque sensing element configured upon a substrate in association with an antenna for sending and receiving wireless signals; and
    controlling said torque sensor utilizing a plurality of electronic controlling components, wherein said plurality of electronic controlling components and an antenna are configured upon another single separate substrate for sending and receiving said wireless signals to and from said torque sensor, such that said torque sensor is located on a rotating member in order to generate signals indicative of a torque associated with said rotating member, wherein said signals are wirelessly transmittable from said torque sensor via said antenna configured upon said substrate in association with said torque sensor.

15. The system of claim 14 further comprising providing said rotating member as a shaft.

16. The method of claim 14 further comprising providing an engine control unit for controlling an automotive engine, wherein said engine control unit is connected to an antenna that receives a signal transmitted wirelessly from said torque sensor.

17. The method of claim 14 further comprising providing a transmission control unit for controlling an automotive transmission, wherein said transmission control unit is connected to an antenna that receives a signal transmitted wirelessly from said torque sensor.

18. The method of claim 14 further comprising configuring said torque sensor to comprise an acoustic wave torque sensor.

19. The method of claim 18 further comprising configuring said acoustic wave sensor to comprise at least one of the following types of components;
  a surface acoustic wave filter;
  a surface acoustic wave resonator;
  a surface acoustic wave delay line; or
  a bulk acoustic wave resonator.

20. The method of claim 14 further comprising providing said torque sensor to comprise a magneto-elastic torque sensor.

* * * * *